(12) United States Patent
Knoll et al.

(10) Patent No.: US 11,981,450 B2
(45) Date of Patent: May 14, 2024

(54) TORQUE CONTROL FOR BALLOON COUPLING

(71) Applicant: Aerostar International, LLC, Columbia, MD (US)

(72) Inventors: Matthew Knoll, Redwood City, CA (US); Michael Eglington, Burlingame, CA (US)

(73) Assignee: Aerostar International, LLC, Columbia, MD (US)

( * ) Notice: Subject to any disclaimer, the term of this patent is extended or adjusted under 35 U.S.C. 154(b) by 0 days.

(21) Appl. No.: 17/820,734

(22) Filed: Aug. 18, 2022

(65) Prior Publication Data

US 2024/0002068 A1 Jan. 4, 2024

Related U.S. Application Data

(63) Continuation of application No. 16/222,341, filed on Dec. 17, 2018, now Pat. No. 11,434,022.

(51) Int. Cl.
| | |
|---|---|
| B64D 47/00 | (2006.01) |
| B64B 1/40 | (2006.01) |
| H02S 10/40 | (2014.01) |
| H02S 20/32 | (2014.01) |
| H04B 7/185 | (2006.01) |

(52) U.S. Cl.
CPC ............... B64D 47/00 (2013.01); B64B 1/40 (2013.01); H02S 10/40 (2014.12); H02S 20/32 (2014.12); H04B 7/18508 (2013.01)

(58) Field of Classification Search
CPC .......... B64D 47/00; B64B 1/40; H02S 10/40; H02S 20/32; H02S 7/185; H04B 7/18508
See application file for complete search history.

(56) References Cited

U.S. PATENT DOCUMENTS

| | | | |
|---|---|---|---|
| 8,897,933 B1 | 11/2014 | Teller et al. | |
| 9,902,480 B1 | 2/2018 | Cromie et al. | |
| 10,035,576 B1 | 7/2018 | Brookes et al. | |
| 11,434,022 B2* | 9/2022 | Knoll | B64D 47/00 |
| 2017/0331177 A1 | 11/2017 | MacCallum et al. | |
| 2018/0194467 A1 | 7/2018 | Hoheisel et al. | |
| 2020/0189765 A1 | 6/2020 | Knoll et al. | |

OTHER PUBLICATIONS

"U.S. Appl. No. 16/222,341, Corrected Notice of Allowability dated May 25, 2022", 4 pgs.
"U.S. Appl. No. 16/222,341, Corrected Notice of Allowability dated Jun. 2, 2022", 2 pgs.
"U.S. Appl. No. 16/222,341, Notice of Allowance dated May 2, 2022", 7 pgs.

* cited by examiner

Primary Examiner — Robert L Deberadinis
(74) Attorney, Agent, or Firm — Kim and Lahey Law Firm, LLC; Douglas W. Kim (57) ABSTRACT

Aspects of the disclosure provide for controlling orientation of a payload of a balloon through a despin mechanism. In one instance, a system may include a flexible coupling configured to reduce effects of a balloon envelope tilting on a payload, a sensor configured to measure rotational displacement of the flexible coupling, a despin mechanism including a motor configured to rotate the payload, and a controller. The controller may be configured to use receive the measured rotational displacement and to use the despin mechanism to rotate the payload towards a preferred orientation based on the measured rotational displacement.

18 Claims, 8 Drawing Sheets

TORQUE CONTROL FOR BALLOON COUPLING

RELATED APPLICATIONS

This application is a continuation of U.S. patent application Ser. No. 16/222,341, filed Dec. 17, 2018, which application is incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. For instance, during flight, these balloons may use changes in altitude to achieve navigational direction changes. As an example, a balloon may pump air into a bladder within the envelope which causes a shift in the center of gravity of the balloon, which in turn, causes the envelope to tilt to one side. In some examples, this tilt can be up to 60 degrees from vertical.

In cases where the balloons' payloads carry networking equipment or other devices powered at least in part by solar, the balloon may also include a solar panel. In such cases, while even while the balloon is tilted, it is important to keep the solar panel oriented towards the sun and/or the networking equipment oriented in a particular direction. A despin mechanism may be used to orient the payload by torquing against the balloon.

BRIEF SUMMARY

Aspects of the present disclosure are advantageous for high altitude balloon systems. For instance, one aspect of the disclosure provides a system including a flexible coupling configured to reduce effects of a balloon envelope tilting on a payload; a sensor configured to measure rotational displacement of the flexible coupling; a despin mechanism including a motor configured to rotate the payload; and a controller. The controller is configured to receive the measured rotational displacement and use the despin mechanism to rotate the payload towards a preferred orientation based on the measured rotational displacement.

In one example, the payload includes a solar panel, and the preferred orientation corresponds to the solar panel being oriented towards the sun. In another example, the payload includes a communications system, and the preferred orientation corresponds to the communications system being oriented in a particular direction to send and receive information with a network target. In another example, the flexible coupling includes a first end and a second end, and wherein the sensor is configured to measure rotational displacement between the first end and the second end. In another example, the controller is further configured to control the despin mechanism based on the amount of torque in order to attempt to maintain zero torque at the flexible coupling. In another example, the sensor is a magnetic encoder. In another example, the sensor is an optical encoder. In another example, the sensor is a potentiometer. In another example, the sensor is a strain gauge. In another example, the system also includes a thermometer configured to measure temperature of the flexible coupling, and wherein the controller is further configured to use the despin mechanism further based on the temperature measurement. In another example, the system also includes a thermometer configured to measure ambient temperature near the flexible coupling, and wherein the controller is further configured to use the despin mechanism further based on the ambient temperature. In another example, the system also includes the payload. In this example, the system also includes the balloon envelope.

Another aspect of the disclosure provides a method of orienting a payload of a balloon. The method includes identifying, by a controller, a preferred orientation of the payload; receiving, by the controller, displacement information from a sensor configured to measure rotational displacement of a flexible coupling; determining, by the controller, a control action based on the received displacement information; and sending, by the controller, a signal to a despin mechanism to cause the despin mechanism to rotate the payload according to the control action and towards the identified preferred orientation of the payload.

In one example, the method also includes receiving, by the controller, orientation information from an orientation sensor identifying a current orientation of the payload, and wherein the control action is determined further based on the received orientation information. In another example, determining the control action includes determining an amount of torque based on the measured rotational displacement. In this example, the amount of torque is determined based on stiffness of the flexible coupling. In addition, the method also includes receiving temperature information from a thermometer and using the temperature information to determine the stiffness of the flexible coupling, and wherein the amount of torque is determined further based on the determined stiffness. In addition, the temperature is a temperature of the flexible coupling. In another example, the method also includes controlling the despin mechanism in order to attempt to maintain zero torque at the flexible coupling.

DETAILED DESCRIPTION

The present disclosure generally relates to providing techniques for controlling torque in couplings for high-altitude balloons such as those used in communication networks. A single network may include a large number of balloons, each of which includes a balloon envelope, a payload including a solar panel as well as communications devices, and a cable or other connection between the balloon envelope and the payload. During flight, these balloons may use changes in altitude to achieve navigational direction changes. For example, a balloon may pump air into a bladder within the balloon envelope which causes a shift in the center of gravity of the balloon, which in turn, causes the envelope to tilt to one side. In some examples, this tilt can be up to 60 degrees from vertical. However, for the payload such tilting is undesirable and may impair communication performance. Accordingly, reducing the payload tilt can be important.

In addition to reducing tilting, to keep communications devices oriented in the preferred direction in order to send and receive information with other high altitude platforms or ground stations, it is can also be important to keep the solar panel oriented towards the sun. During flight, the balloons may rotate for a number of reasons, including moving gases within the balloon envelope, changes in internal and external temperature, changes in altitude, etc. To counteract the effects of this rotation on the payload, a despin mechanism may be used to torque the payload against the balloon.

The despin mechanism may include a motor configured to rotate the payload in order to maintain a preferred orientation of the payload. A controller may, receive signals from an orientation sensor identifying the current orientation of the payload and determine how to control the despin mechanism in order to reach a preferred orientation. In this regard, the despin mechanism may receive signals from the controller and rotate the payload from the current orientation to achieve the preferred orientation. However, the aforementioned tilting can also affect performance of the despin mechanism as well as signals from the orientation sensor.

To address all this, a flexible coupling may be used to keep the despin mechanism and payload level (with respect to the ground) during tilt. For instance, this flexible coupling may bend axially to keep the payload level. In order to allow the despin mechanism to properly control the rotation and orientation of the payload, it may be important to keep the coupling torsionally stiff. On the other hand, to prevent tilt, the coupling must be flexible, and this flexibility, can affect the usefulness of the despin mechanism by acting as a torsional spring and transmitting torque to the payload as a result of these changes. This flexibility may make the problem of controlling the orientation of the payload through the despin mechanism more difficult.

To counteract the difficulty introduced by the rotation at the flexible coupling, the torsional displacement of the flexible coupling may be measured. This may be achieved by measuring the displacement of the top and bottom portions of the flexible coupling relative to one another and/or the cable. The controller may use this measurement to estimate the effects of the "wind up" on the orientation of the payload. For instance, the controller may determine how much to "over" rotate the payload via the despin mechanism in order to counteract the effects of the flexible coupling "unwinding."

The features described herein may allow for the use of a flexible coupling to address the aforementioned tilt with respect to the payload and allow the despin mechanism to remain level and operate freely during tilt problem, while also addressing the torsional effects of the flexible coupling on the orientation of the payload.

Example System

Figure 1:
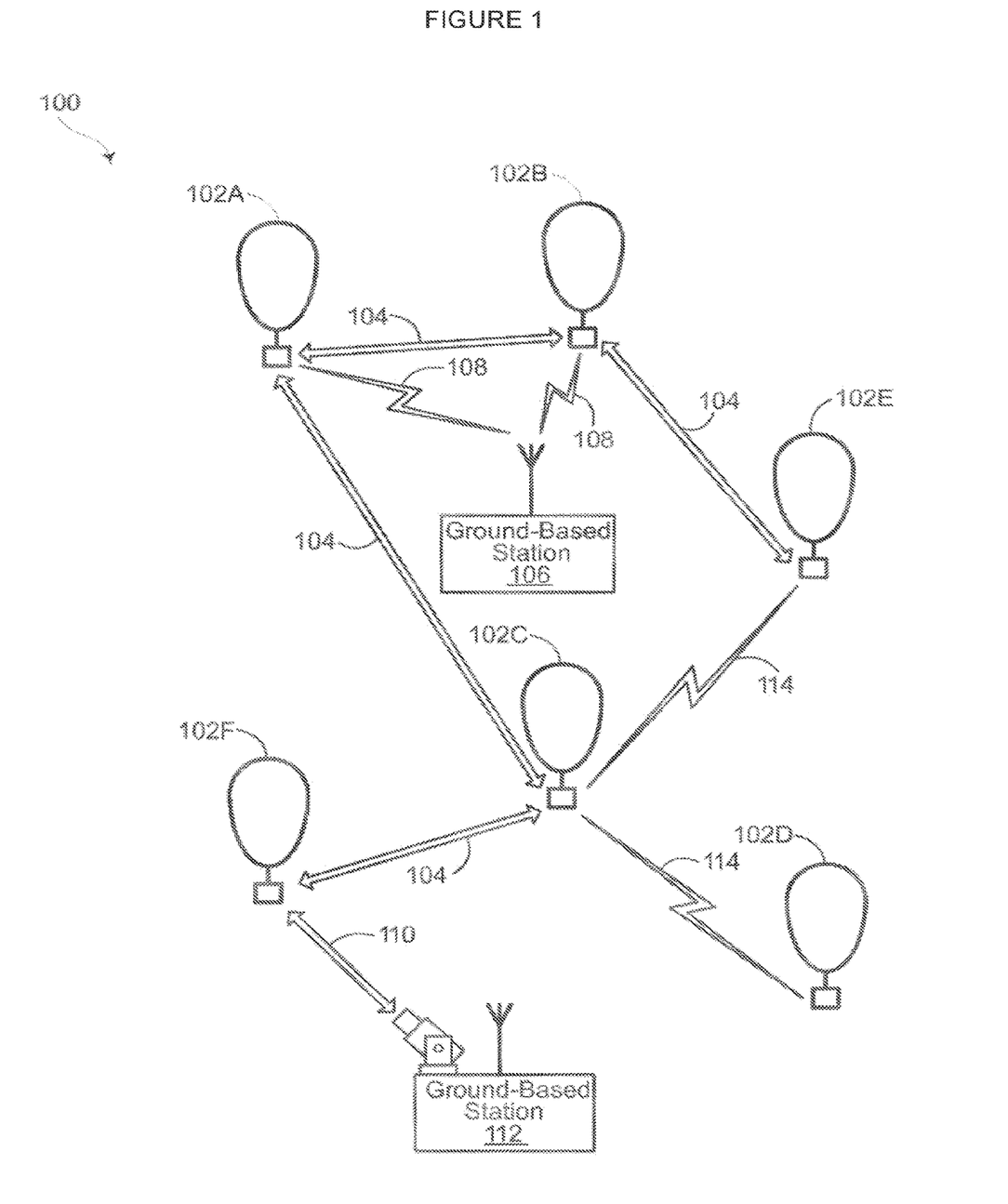
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
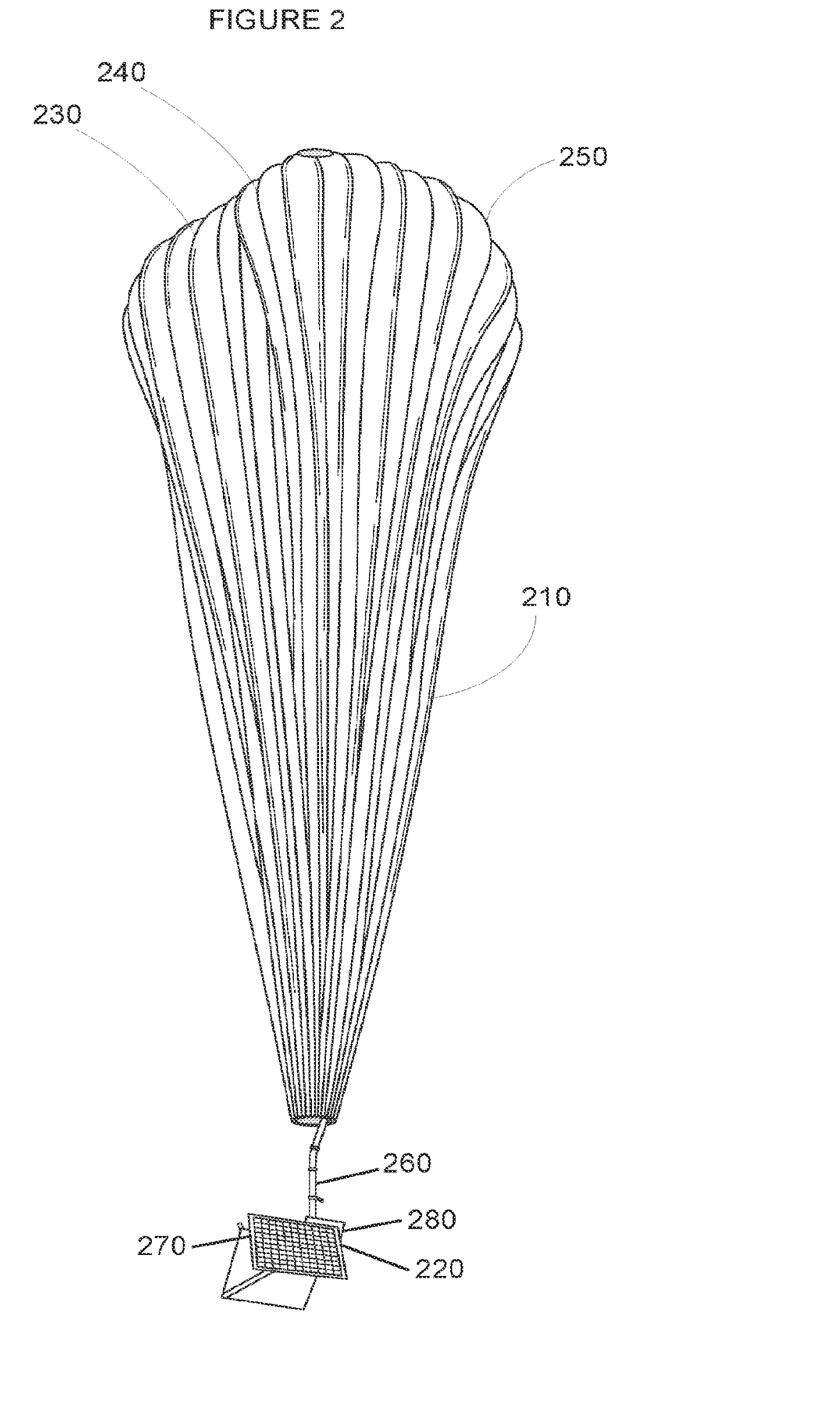
FIG. 2 is an example of a balloon in accordance with aspects of the present disclosure.

FIG. 2 is an example balloon 200, which may represent any of the balloons of the system 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable or other structure. The payload 220 may include a computer system (not shown), having one or more processors and on-board data storage. The payload 220 may also include various other types of equipment and systems (not shown) to provide a number of different functions. For example, the payload 220 may include various communication systems 280 such as optical and/or radio frequency (RF), a navigation system, a positioning system, a lighting system, an altitude control system, a plurality of solar panels 270 for generating power, a power supply (such as one or more batteries) to store and supply power to various components of balloon 200.

Example Assembly

Figure 3:
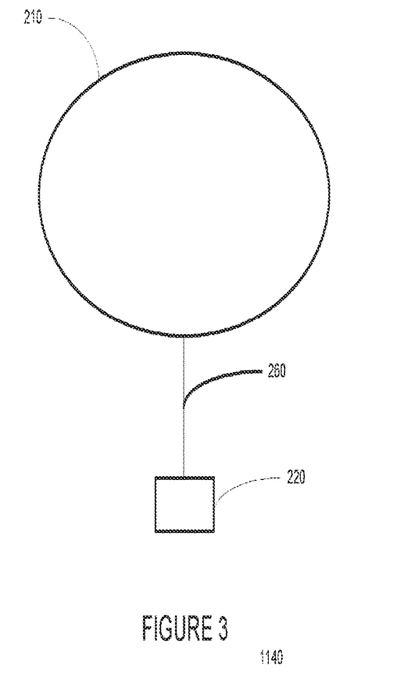
FIGS. 3 and 4 are examples of a balloon in flight in accordance with aspects of the disclosure.
Figure 4:
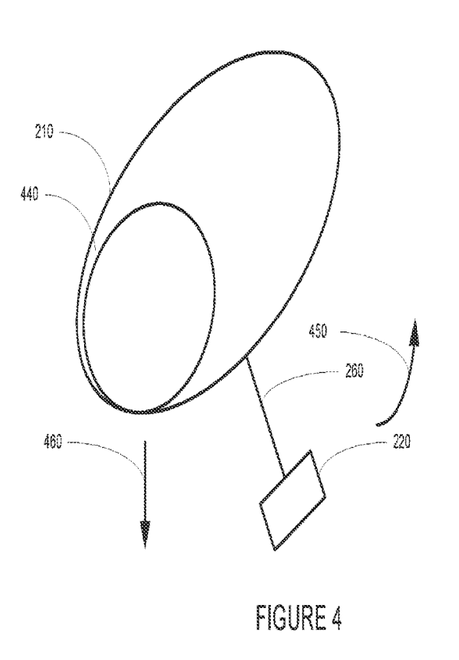

During flight, these balloons may use changes in altitude to achieve navigational direction changes. For example, a balloon may pump air ballast into a bladder within the balloon envelope which causes a shift in the center of gravity of the balloon, which in turn, causes the envelope to tilt to one side. FIGS. 3 and 4 are examples of high altitude balloons in flight. In these examples, the shapes and sizes of the balloon envelope 210, connection 260, air ballast 440, and payload 220 are exaggerated for clarity and ease of understanding. In the example of FIG. 3, the balloon 200 is generally in line with the payload 220 via the connection 260. In the example of FIG. 4, a descent maneuver is accomplished by inflating an air ballast 440 with a gas, such as air, that is heavier than the lift gas. This causes the balloon envelope 210 to tilt in the direction of the air ballast 440. As can be seen in FIG. 4, if rigidly connected to the balloon, the payload 220 will also tilt as shown by arrow 450, away from the direction of the pull force of the air ballast 440 shown by arrow 460. This causes the payload to no longer be level or in line with the ground surface 470. In some examples, this tilt can be up to 60 degrees from vertical. However, for the communication systems 280 such tilting is undesirable and may impair performance of the aforementioned communication systems. Accordingly, reducing the payload tilt during such turning maneuvers can be important.

In addition to reducing tilting, it can be important to keep the payload oriented in a preferred direction. For instance, to keep communications systems 280 oriented in the preferred direction in order to send and receive information with network targets, such as for instance, other high altitude platforms and/or ground stations. It can also be important to keep the solar panel oriented towards the sun in order to maximize power collection. During flight, the balloons may rotate for a number of reasons, including moving gases within the balloon envelope, changes in internal and external temperature, changes in altitude, etc. For instance, gases moving within the balloon envelope may cause the balloon envelope to rotate. As the balloon envelope 210 rotates, the payload may tend to rotate with it, changing the orientation of the payload relative to the sun and the earth. Again, this can move the solar panels 270 and/or the communication systems 280 out of alignment with the sun and network targets, respectively. To counteract the effects of this rotation on the payload, a despin mechanism may be used to torque the payload against the balloon. However, the aforementioned tilting can also affect performance of the despin mechanism as well as signals from the orientation sensor.

Figure 5:
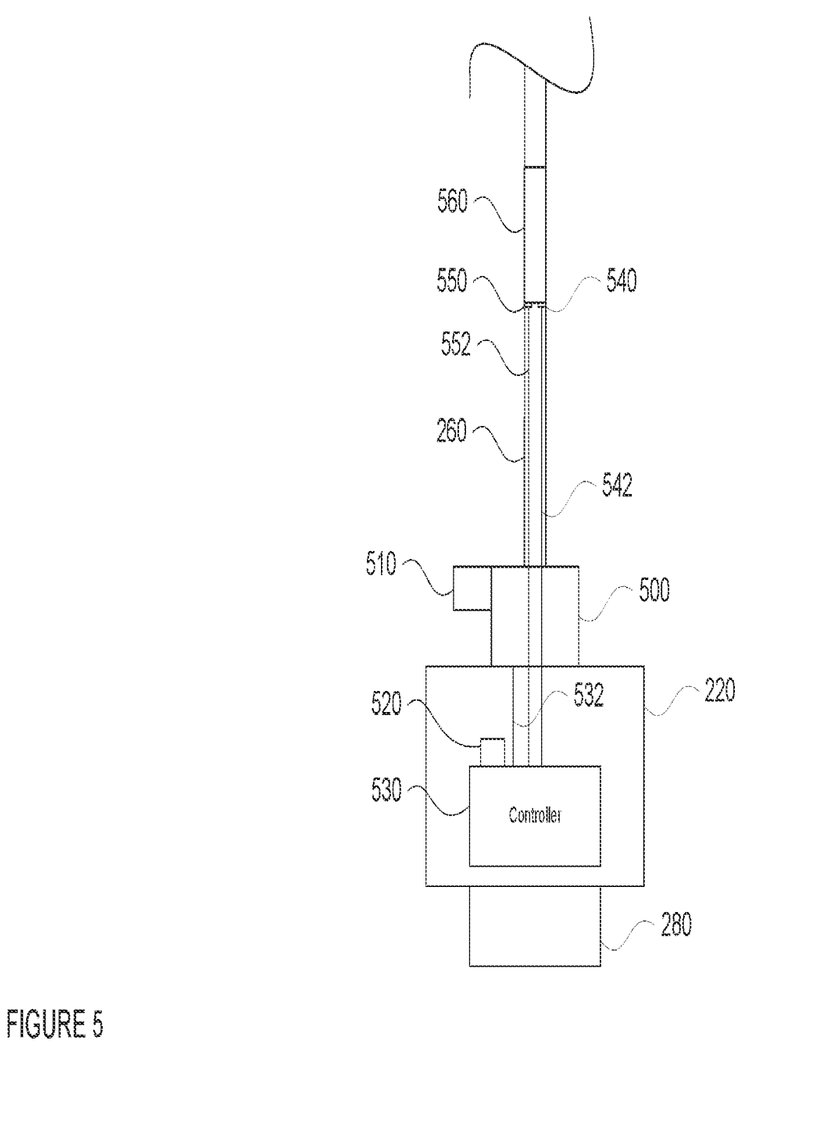
FIG. 5 is an example view of a portion of a balloon in accordance with aspects of the disclosure.

Turning to FIG. 5, a despin mechanism 500 includes a motor 510 configured to rotate the payload in order to maintain a preferred orientation of the payload. The motor 510 may include a rotary gear box with a harmonic drive with an encoder which allows the motor to react to signals to control the rotation smoothly and quickly. The despin mechanism 500 may also include various wired or wireless connections (not shown) to allow the despin mechanism to receive signals from a controller 530. The controller 530 may then cause the motor to rotate the payload to or towards the preferred orientation.

The controller 530 may receive signals from an orientation sensor 520 such as an accelerometer or gyroscope identifying the current orientation of the payload and determine how to control the despin mechanism in order to reach a preferred orientation, for instance, based on a current orientation of the solar panels 270 and/or the communications systems 280. In this regard, the despin mechanism 500 may receive signals from the controller 530, via a wireless or wired connection 532, and rotate the payload from the current orientation to achieve the preferred orientation. In other words, the controller may send signals indicating how the despin mechanism should rotate the payload. In this regard, the controller 530 and/or the orientation sensor 520 may be located at the despin mechanism or remotely, for instance, at the payload 220 as shown in FIG. 5.

To address all this, a flexible coupling 560 may be used to keep the despin mechanism and payload level (with respect to the ground surface 470) even as the balloon tilts. The flexible coupling may take any number of different forms. While it is desired that the coupling be flexible about axes transverse to the connection between the balloon and the payload, it may be that, due the nature of the chosen coupling, the coupling is also flexible about the axis of the connection between the balloon and the payload (i.e. flexible in torsion). Examples of couplings with both transversal and axial flexibility may include a flexible cable, a flexible hose or tube, a flexible rubber joint, a plurality of interconnected discs, or any other connection which is flexible in multiple degrees of freedom including torsionally. In other words, the flexible coupling may be torsionally flexible, or rather, may be able to twist or "wind up" relative to one or both ends of the flexible coupling. In general, with regard to controlling the azimuthal orientation of the payload, this torsional flexibility is an undesirable side effect of the flexible coupling, and this invention addresses a system and method to provide effective azimuthal orientation control despite the torsional flexibility.

Figure 6:
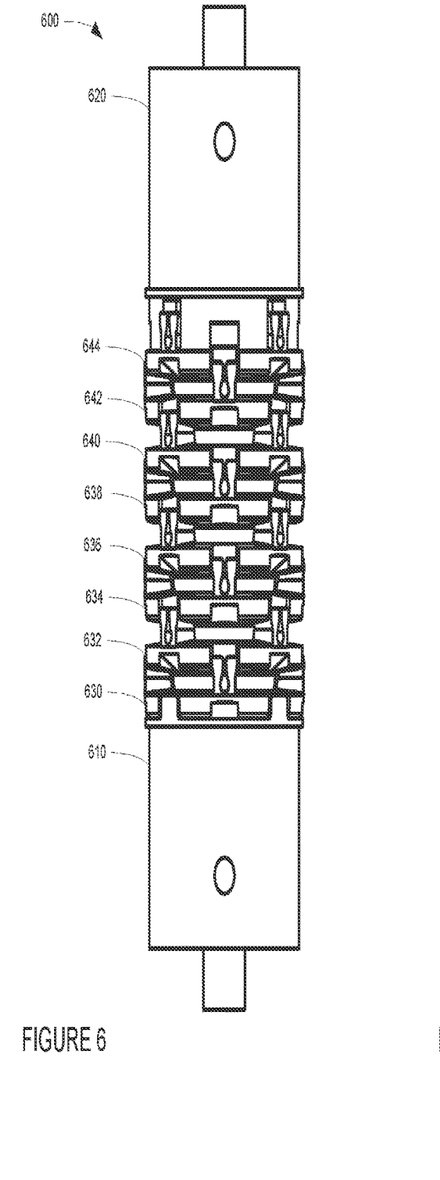
FIGS. 6 and 7 are example views of a flexible coupling in accordance with aspects of the present disclosure.
Figure 7:
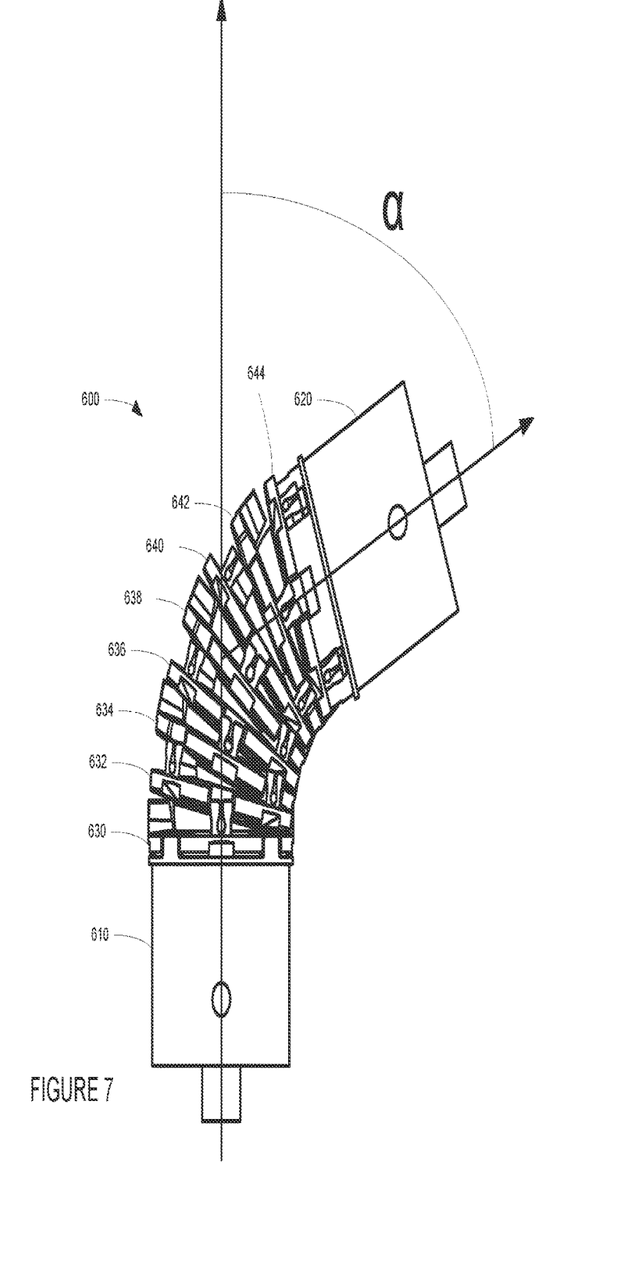

For instance, turning to FIGS. 6 and 7, flexible coupling 600 is an example configuration for the flexible coupling 560 of FIG. 5. Of course, as mentioned above, the flexible coupling 560 may take any number off different forms. In this example, the flexible coupling 600 may include a first end or bottom portion 610, a second end or top portion 620, and a plurality of discs 630-644 there between. This configuration may allow the flexible connection 600 to flex to an angle of a as shown in FIG. 7. This configuration may also allow one or more of the plurality of discs 630-644 to flex rotate relative to the bottom portion 610 or top portion 620.

Figure 8:
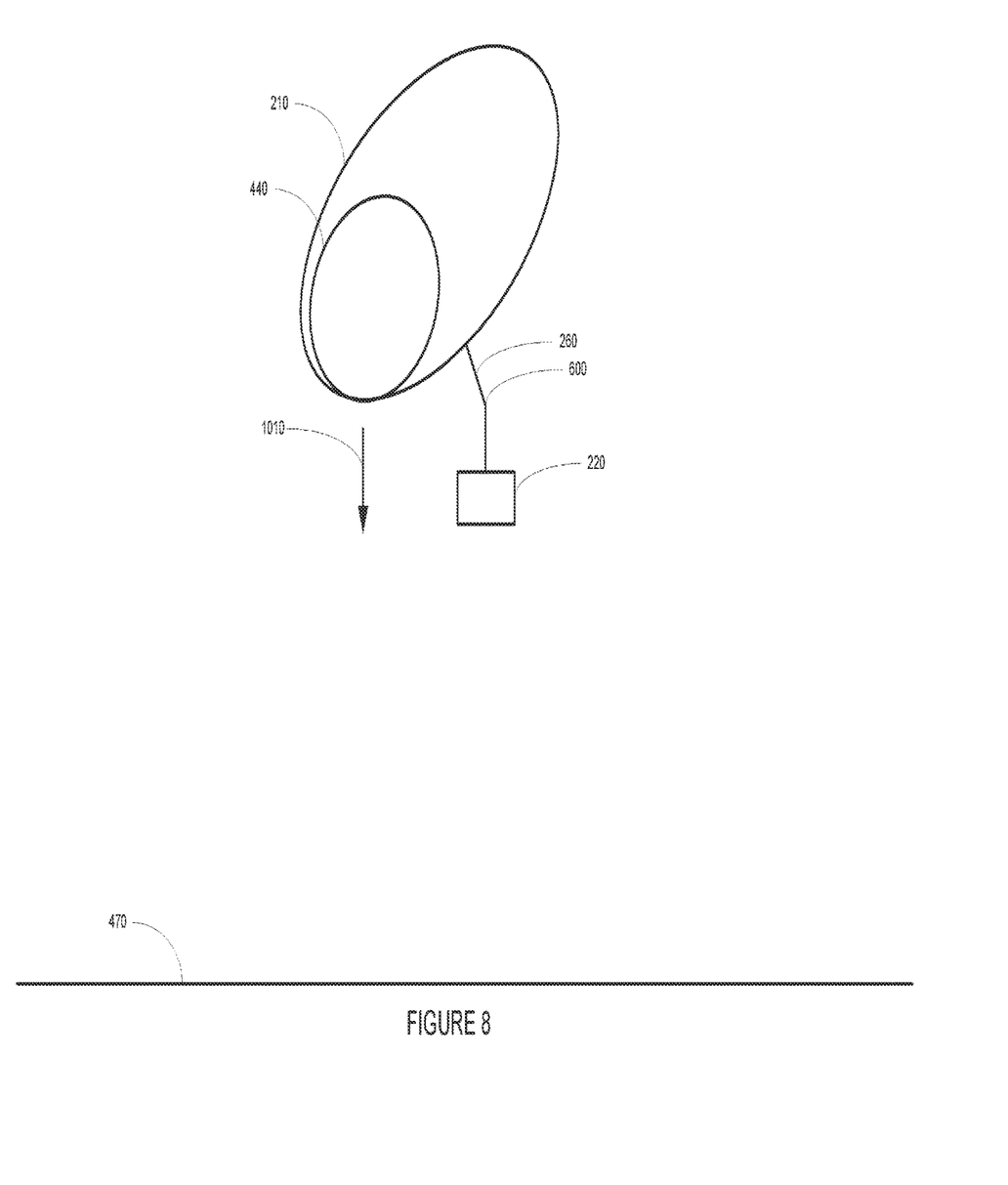
FIG. 8 is an example of a balloon in flight in accordance with aspects of the disclosure.

Because of its flexibility, the flexible coupling may keep the payload level or in a preferred orientation relative to the ground surface or the gravity vector. Returning to FIG. 4, without the flexible coupling 560, the payload 220 tilts with the balloon in an arc shown by arrow 450, away from the direction of the pull force of the air ballast 440 shown by arrow 460. This causes the payload to no longer be level or in line with the ground surface 470. However, in the example of FIG. 8, the pull force of the payload causes the flexible coupling to move to the flexed orientation. The greater the mass of ballast air, the greater the tilt angle of the balloon, and thus the greater the deflection in the flexible coupling. This enables the payload to remaining vertically aligned with the gravity vector represented by arrow 1010 (or level to the ground surface 470).

In order to allow the despin mechanism to properly control the rotation and orientation of the payload, it may be important to keep the coupling torsionally stiff. On the other hand, to prevent tilt, the coupling must be flexible in multiple degrees of freedom, including torsionally. However, this torsional flexibility may allow the flexible coupling to rotate or twist between its ends. At a certain point, the flexible coupling may untwist causing a torsional force on the payload. This rotation and the corresponding forces may make the problem of controlling the orientation of the payload through the despin mechanism 500 more difficult.

To counteract the difficulty introduced by the rotation at the flexible coupling 600, the torsional displacement of the flexible coupling may be measured. This may be achieved by measuring the displacement of the ends of the flexible coupling 560 relative to one another and/or the connection 260. For instance, referring to the flexible coupling 600 of FIG. 6, the displacement of the top and bottom portions 610, 620 relative to one another and/or the connection 260 may be measured. In other words, the amount of twisting or "wind up" of the flexible coupling may be measured by a sensor.

Returning to FIG. 5, a sensor 540 is located adjacent to the bottom portion 610. However, the location of the sensor may vary depending upon the type of information measured, configuration of the sensor, and/or the configuration of the balloon 200. The sensor 540 may include, for instance, a magnetic encoder, an optical encoder, a potentiometer, other types of rotary encoders, a strain gauge, etc.

This measurements from the sensor 540 may be sent to the controller 530 via a wireless or wired connection 542. The controller may use this measurement, as well as the measurement of the orientation of the payload received from the orientation sensor 520, to determine the effects of the twisting and untwisting or rather, the rotation at the flexible coupling, on the orientation of the payload 220 and/or components of the payload such as communications systems and/or the solar panels 270. For instance, the controller 530 may determine a torque value which corresponds to how much to over-rotate the payload 220 via the despin mechanism 540 in order to counteract the effects of the flexible coupling unwinding. This may allow the controller 530 to better maintain a preferred orientation of the solar panels 270 (for instance, relative to the sun) and/or a preferred orientation of the communication systems 280 (for instance, relative to a particular direction in order to send and receive information with a network). Alternatively or additionally, the controller 530 may be configured to attempt to maintain zero torque across the flexible coupling 600 using the despin mechanism 500.

In some instances, the temperature of the flexible coupling and/or ambient temperature near the flexible coupling may be measured using one or more thermometers. For instance, a thermometer 550 is located adjacent to the bottom portion 610. However, the location of the thermometer may vary depending upon the type of information measured, configuration of the sensor, and/or the configuration of the balloon 200. The temperature measurement may be sent to the controller 530 via a wireless or wired connection 552.

The controller 530 may then use the temperature measurement to estimate stiffness of the flexible coupling which may change with the temperature, for instance, according to Hooke's law. For instance, at colder temperatures the flexible coupling 600 may tend to be stiffer which may result in less displacement for a given amount of torque. Similarly at warmer temperatures, the flexible coupling 60 may tend to be more flexible which may result in greater displacement for the given amount of torque. Thus, the controller 530 may use this temperature measurement to determine how much torque is required for the despin mechanism 500 to maintain zero torque across the flexible coupling 600.

Figure 9:
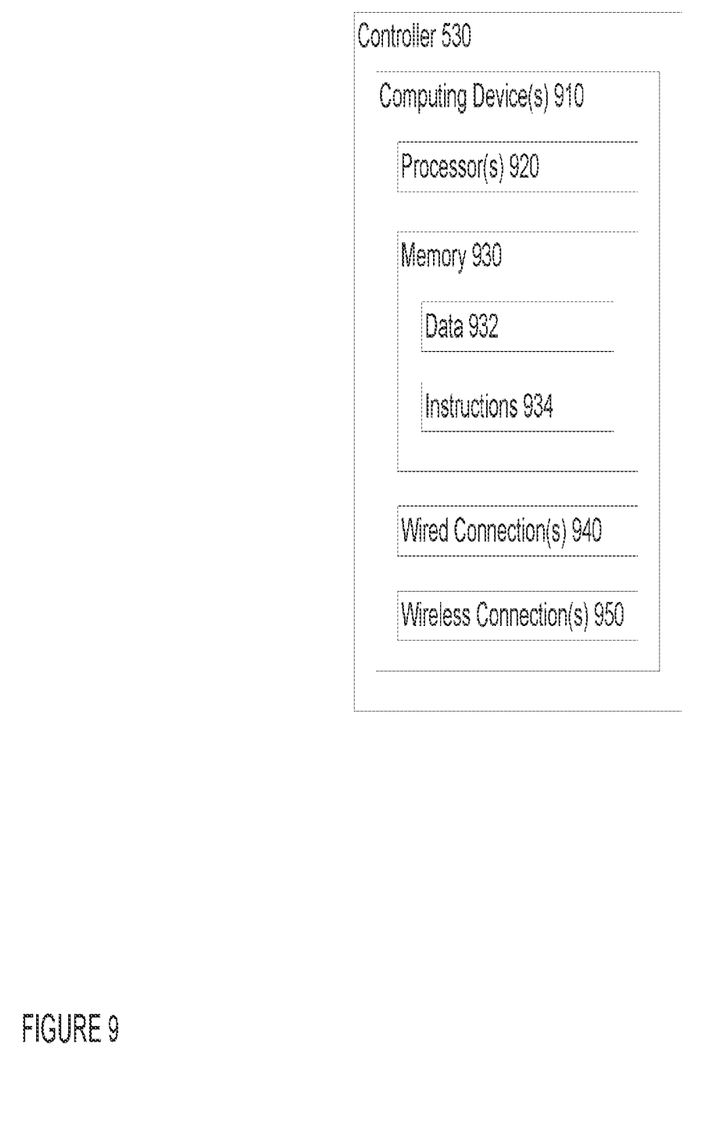
FIG. 9 is an example functional view of a controller in accordance with aspects of the disclosure.

Turning to FIG. 9, to enable the controller 530 to perform the operations described herein, the controller 530 may include one or more computing devices 910 including one or more processors 920, memory 930 and other components typically present in general purpose computing devices.

The memory 930 stores information accessible by the one or more processors 120, including instructions 934 and data 932 that may be executed or otherwise used by the processor 920. The memory 930 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 934 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 932 may be retrieved, stored or modified by processor 920 in accordance with the instructions 934. For instance, although the claimed subject matter is not limited by any particular data structure, the data may be stored in computing device registers, in a relational database as a table having a plurality of different fields and records, XML documents or flat files. The data may also be formatted in any computing device-readable format. For instance, data may store information about the expected location of the sun relative to the earth at any given point in time as well as information about the location of network targets.

The one or more processor 920 may be any conventional processors, such as commercially available CPUs or GPUs. Alternatively, the one or more processors may be a dedicated device such as an ASIC or other hardware-based processor. Although FIG. 9 functionally illustrates the processor, memory, and other elements of computing device 910 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 910. Accordingly, references to a processor or computing device will be understood to include references to a collection of processors or computing devices or memories that may or may not operate in parallel.

Computing device 910 may also include wired 940 and wireless connections 950 to facilitate communication with other devices, such as the encoder of the despin mechanism 500, sensor 540, and thermometer 550. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies. Ethernet, WiFi and HTTP, and various combinations of the foregoing.

Example Flow Diagram

Figure 10:
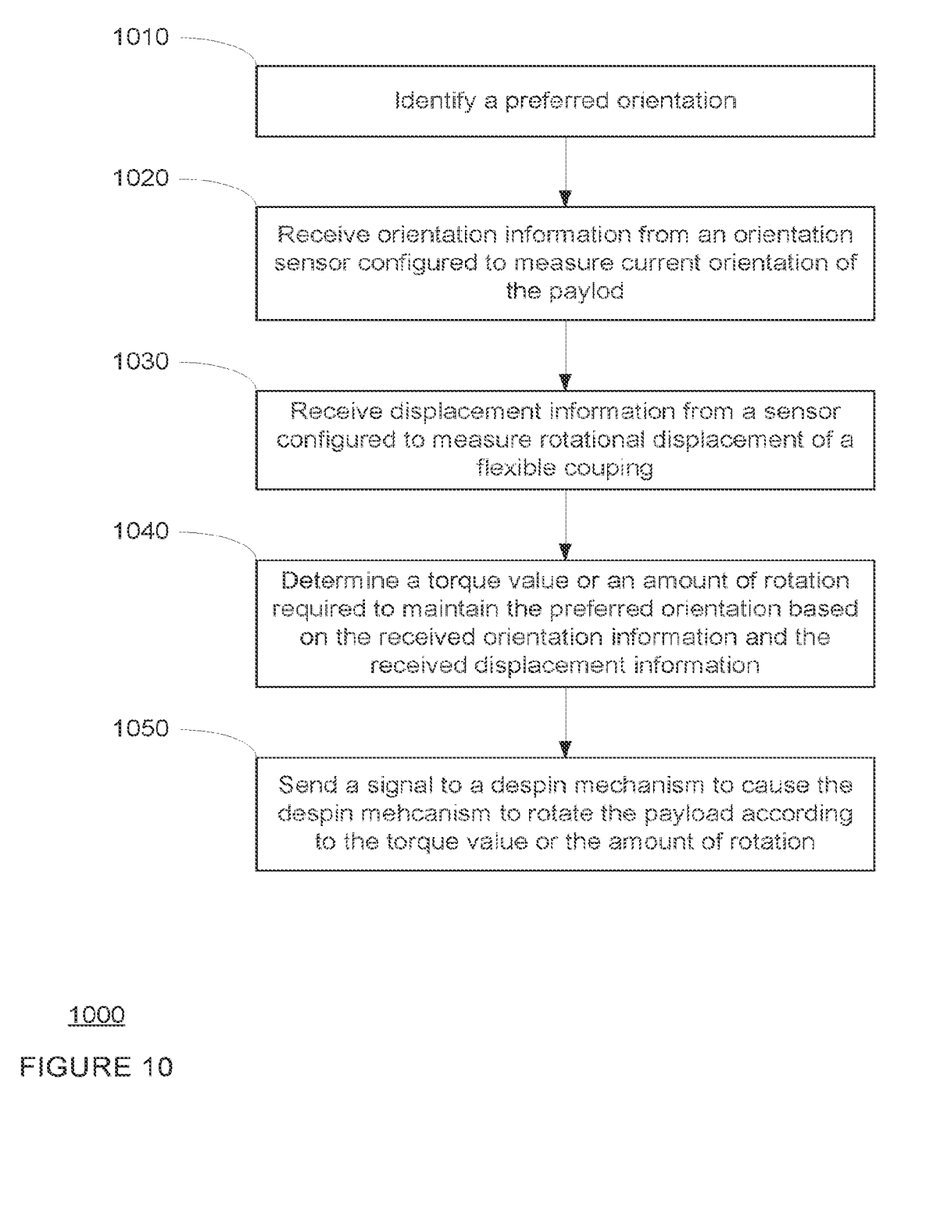
FIG. 10 is a flow diagram in accordance with aspects of the disclosure.

FIG. 10 is an example flow diagram 1000 in accordance with aspects of the disclosure which may be performed, for instance, by the one or more computing devices 910, processors 920, and other features of the controller 530. In this example, at block 1010, the controller may identify a preferred orientation of the payload. This may be determined, for instance, using data of memory 1030 about the current location of the sun and the location of the solar panels 270 relative to the payload and/or using data of memory 1030 about the location of a network target and the location of communication systems 280 relative to the payload. At block 1020, the controller may receive orientation information from an orientation sensor configured to measure orientation of the payload. At block 1030, the controller may also receive displacement information a sensor configured to measure rotational displacement of a flexible coupling. For instance, the controller 530 may receive information about the orientation of the payload 220 from the orientation sensor 520, and a measurement of the rotational displacement of the flexible coupling 600 from the sensor 540. At block 1040, the controller may determine a torque value or an amount of rotation required to maintain the preferred orientation based on the received orientation information and the received displacement information. In some instances, the received information may also include information received from a thermometer, such as thermometer 550, and the determined amount of rotation may be further based on how the temperature affects the stiffness of the flexible coupling 600. At block 1050, the controller may send a signal to a despin mechanism to cause the despin mechanism to rotate the payload according to the torque value or the amount of rotation. In this way, the controller and despin mechanism can counteract any effects of rotation or rotational displacement from the flexible coupling on the payload.

Thus, the features described herein may allow for the use of a flexible coupling to address the aforementioned tilt with respect to the payload and allow the despin mechanism to remain level and operate freely during tilt, while also addressing the torsional effects of the flexible coupling on the orientation of the payload and attempting to maintain zero torque across the flexible coupling.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a flexible coupling connecting a balloon envelope to a payload;
   a despin mechanism including a motor configured to rotate the payload; and
   a controller operatively associate with the despin mechanism to rotate the payload towards a preferred orientation based on movements of said flexible coupling.

2. The system of claim 1, wherein the payload includes a solar panel, and the preferred orientation corresponds to the solar panel being oriented towards the sun.

3. The system of claim 1, wherein the payload includes a communications system, and the preferred orientation corresponds to the communications system being oriented in a particular direction to send and receive information with a network target.

4. The system of claim 1, wherein the flexible coupling includes a first end and a second end, and wherein a sensor is configured to measure rotational displacement between the first end and the second end.

5. The system of claim 4, wherein the controller is further configured to control the despin mechanism based on the amount of torque in order to attempt to maintain zero torque at the flexible coupling.

6. The system of claim 4, wherein the sensor is a magnetic encoder.

7. The system of claim 4, wherein the sensor is an optical encoder.

8. The system of claim 4, wherein the sensor is a potentiometer.

9. The system of claim 4, wherein the sensor is a strain gauge.

10. The system of claim 1, further comprising a thermometer configured to measure temperature of the flexible coupling, and wherein the controller is further configured to operate the despin mechanism further based on the temperature measurement.

11. The system of claim 1, further comprising a thermometer configured to measure ambient temperature near the flexible coupling, and wherein the controller is further configured to operate the despin mechanism further based on the ambient temperature.

12. A method of orienting a payload of a balloon, the method comprising:
   interconnecting the payload to the balloon with a flexible coupling;
   identifying, by a controller, a preferred orientation of the payload;
   determining, by the controller, a control action based on movement of the flexible coupling; and
   sending, by the controller, a signal to a despin mechanism to cause the despin mechanism to rotate the payload according to the control action and towards the identified preferred orientation of the payload.

13. The method of claim 12, further comprising receive, by the controller, orientation information from an orientation sensor identifying a current orientation of the payload, and wherein the control action is determined further based on the received orientation information.

14. The method of claim 12, wherein determining the control action includes determining an amount of torque based.

15. The method of claim 14, wherein the amount of torque is determined based on stiffness of the flexible coupling.

16. The method of claim 15, further comprising:
   receiving temperature information from a thermometer; and
   using the temperature information to determine the stiffness of the flexible coupling, and wherein the amount of torque is determined further based on the determined stiffness.

17. The method of claim 16, wherein the temperature is a temperature of the flexible coupling.

18. The method of claim 12, further comprising, controlling the despin mechanism in order to attempt to maintain zero torque at the flexible coupling.

* * * * *